United States Patent
Peng et al.

(10) Patent No.: US 8,510,489 B2
(45) Date of Patent: Aug. 13, 2013

(54) COMPUTING DEVICE AND SERIAL COMMUNICATION METHOD OF THE COMPUTING DEVICE

(75) Inventors: Jian Peng, Shenzhen (CN); Ji-Zhi Yin, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 132 days.

(21) Appl. No.: 13/294,196

(22) Filed: Nov. 11, 2011

(65) Prior Publication Data

US 2012/0137035 A1    May 31, 2012

(30) Foreign Application Priority Data

Nov. 26, 2010 (CN) .......... 2010 1 0561692

(51) Int. Cl.
*G06F 13/24*    (2006.01)
*G06F 13/00*    (2006.01)
*G06F 9/44*    (2006.01)

(52) U.S. Cl.
CPC .............. *G06F 9/4411* (2013.01); *G06F 13/24* (2013.01)
USPC ............................ 710/104; 710/261; 710/267

(58) Field of Classification Search
USPC ......................................................... 710/104
See application file for complete search history.

(56) References Cited

U.S. PATENT DOCUMENTS

| 7,424,419 | B1 * | 9/2008 | Fike et al. | 703/23 |
|---|---|---|---|---|
| 7,562,173 | B2 * | 7/2009 | De et al. | 710/267 |
| 7,660,937 | B2 * | 2/2010 | Frantz et al. | 710/313 |
| 2005/0276092 | A1 * | 12/2005 | Hansen et al. | 365/149 |
| 2009/0031051 | A1 * | 1/2009 | Nguyen | 710/15 |
| 2011/0093575 | A1 * | 4/2011 | Dube et al. | 709/223 |
| 2011/0307639 | A1 * | 12/2011 | Dai | 710/106 |
| 2012/0084552 | A1 * | 4/2012 | Sakthikumar et al. | 713/100 |

* cited by examiner

*Primary Examiner* — Ryan Stiglic
(74) *Attorney, Agent, or Firm* — Altis Law Group, Inc.

(57) ABSTRACT

A serial communication method is applied in a computing device to communicate serially with any external serial device. The computing device includes a baseboard management controller (BMC) and an operating system (OS). The BMC includes at least one physical serial port. The method generates a virtual serial port for the OS by emulating serial port functionality of the physical serial port. When the BMC is initializing the physical serial port and a serial device is connected to the physical serial port, an interrupt handler is activated to handle an interrupt triggered to the BMC by the serial device. The interrupt handler is deactivated when the physical serial port has been initialized by the BMC.

18 Claims, 3 Drawing Sheets

US 8,510,489 B2

COMPUTING DEVICE AND SERIAL COMMUNICATION METHOD OF THE COMPUTING DEVICE

BACKGROUND

1. Technical Field

Embodiments of the present disclosure relate to data communication, and particularly to a computing device and a serial communication method of the computing device.

2. Description of Related Art

A super I/O chip may be installed in a computing device such as a server, providing serial port capability for an operating system (OS) of the computing device for serial communication purposes. If no super I/O chip is in the computing device or the serial ports provided by the super I/O chip are unavailable, the OS cannot communicate serially with peripheral serial devices.

DETAILED DESCRIPTION

In general, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of non-transitory computer-readable medium or other non-transitory storage device.

Figure 1:
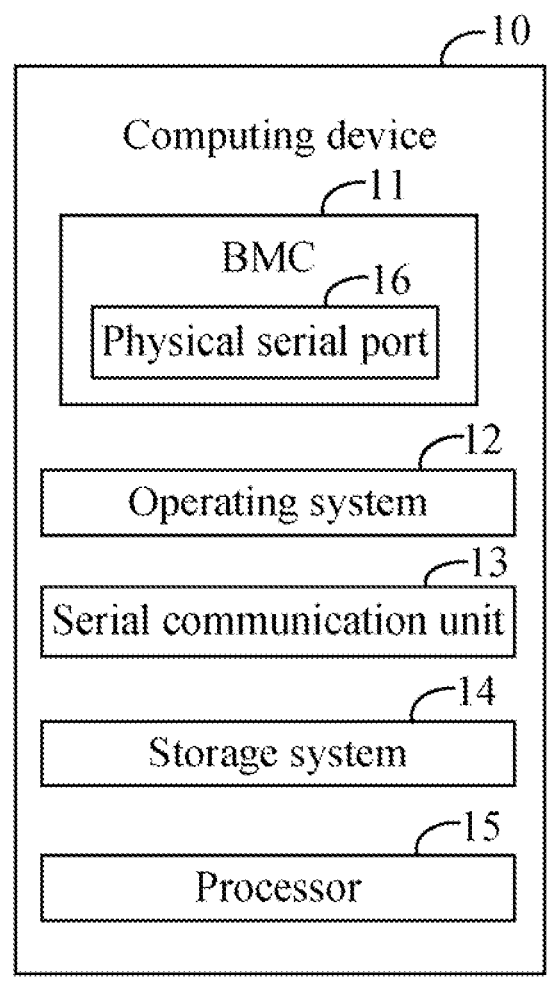
FIG. 1 is a block diagram of one embodiment of a computing device as disclosed.

FIG. 1 is a block diagram of one embodiment of a computing device 100. In the embodiment, the computing device 10 includes a baseboard management controller (BMC) 11, an operating system (OS) 12, a serial communication unit 13, a storage system 14, and at least one processor 15. The BMC 11 includes at least one physical serial port 16 (only one is shown in FIG. 1). The computing device 10 may be a computer or a server, for example.

The serial communication unit 13 enables the OS 12 to communicate serially with one or more serial devices connected to the physical serial port 16. In one embodiment, the serial communication unit 13 may include one or more function modules. The one or more function modules may comprise computerized codes in the form of one or more programs that are stored in the storage system 14. The computerized codes includes instructions executed by the at least one processor 15 to provide functions for the modules of the serial communication unit 13. In one embodiment, the storage system 14 may be an internal storage device, such as a random access memory (RAM) for temporary storage of information, and/or a read only memory (ROM) for permanent storage of information. In some embodiments, the storage system 14 may also be an external storage device, such as an external hard disk, a storage card, or a data storage medium.

Figure 2:
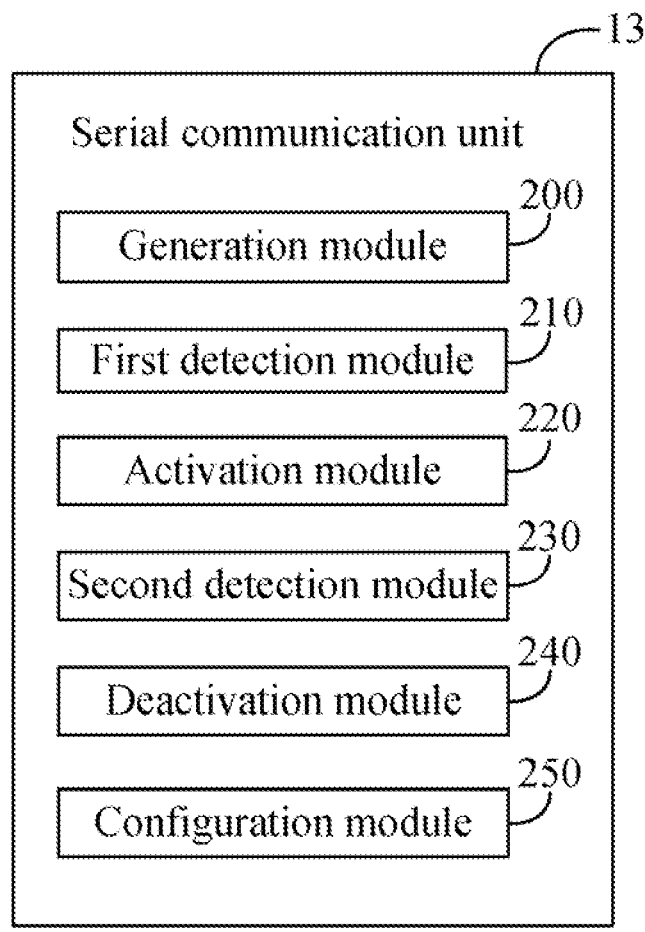
FIG. 2 is a block diagram of one embodiment of a serial communication unit included in the computing device of FIG. 1.

FIG. 2 is a block diagram of one embodiment of the serial communication unit 13 included in the computing device 10 of FIG. 1. The serial communication unit 13 may include a generation module 200, a first detection module 210, an activation module 220, a second detection module 230, a deactivation module 240, and a configuration module 250.

The generation module 200 emulates serial port functionality, such as baud rate, data bits, parity bits, and stop bits of the physical serial port 16 to generate a virtual serial port for the OS 12.

The first detection module 210 detects whether the BMC 11 is initializing the physical serial port 16, and detects whether a serial device is actually connected to the physical serial port 16 when the BMC 11 is initializing the physical serial port 16. The serial device may be a mouse, a keyboard, or a printer, for example. In one embodiment, the BMC 11 may signal the first detection module 210 that the physical serial port 16 is initialized. When the first detection module 210 signaled by the BMC 11, the first detection module 210 detects whether the serial device is connected to the physical serial port 16.

The activation module 220 activates an interrupt handler to handle an interrupt triggered to the BMC 11 by the serial device. It may be understood that the serial device may trigger the interrupt to the BMC 11 when the serial device is first connected to the physical serial port 16. If the interrupt is not handled timely, the initialization of the physical serial port 16 may fail, which renders the physical serial port 16 unavailable. In one embodiment, the interrupt handler sets a certain register of the computing device 10. For example, the interrupt handler may write a predetermined value (either 0 or 1) to a bit of an interrupt register of the computing device 10 to indicate a connected serial device or the absence of any connected serial device.

The second detection module 230 detects whether the physical serial port 16 has been initialized by the BMC 11. In one embodiment, the second detection module 230 detects the state of the physical serial port 16 at a predetermined frequency, such as once a second.

The deactivation module 240 deactivates the interrupt handler if the physical serial port 16 has been initialized by the BMC 11. When the interrupt handler has been deactivated, subsequent interrupts triggered to the OS 12 can be processed.

The configuration module 250 configures parameters of the virtual serial port generated by the generation module 200. In one embodiment, the parameters of the virtual serial port include a serial port number, a baud rate, a data bit length, an optional parity bit, and a stop bit length. After the parameters of the virtual serial port have been configured, the OS 12 can communicate serially with the serial device via the virtual serial port.

Figure 3:
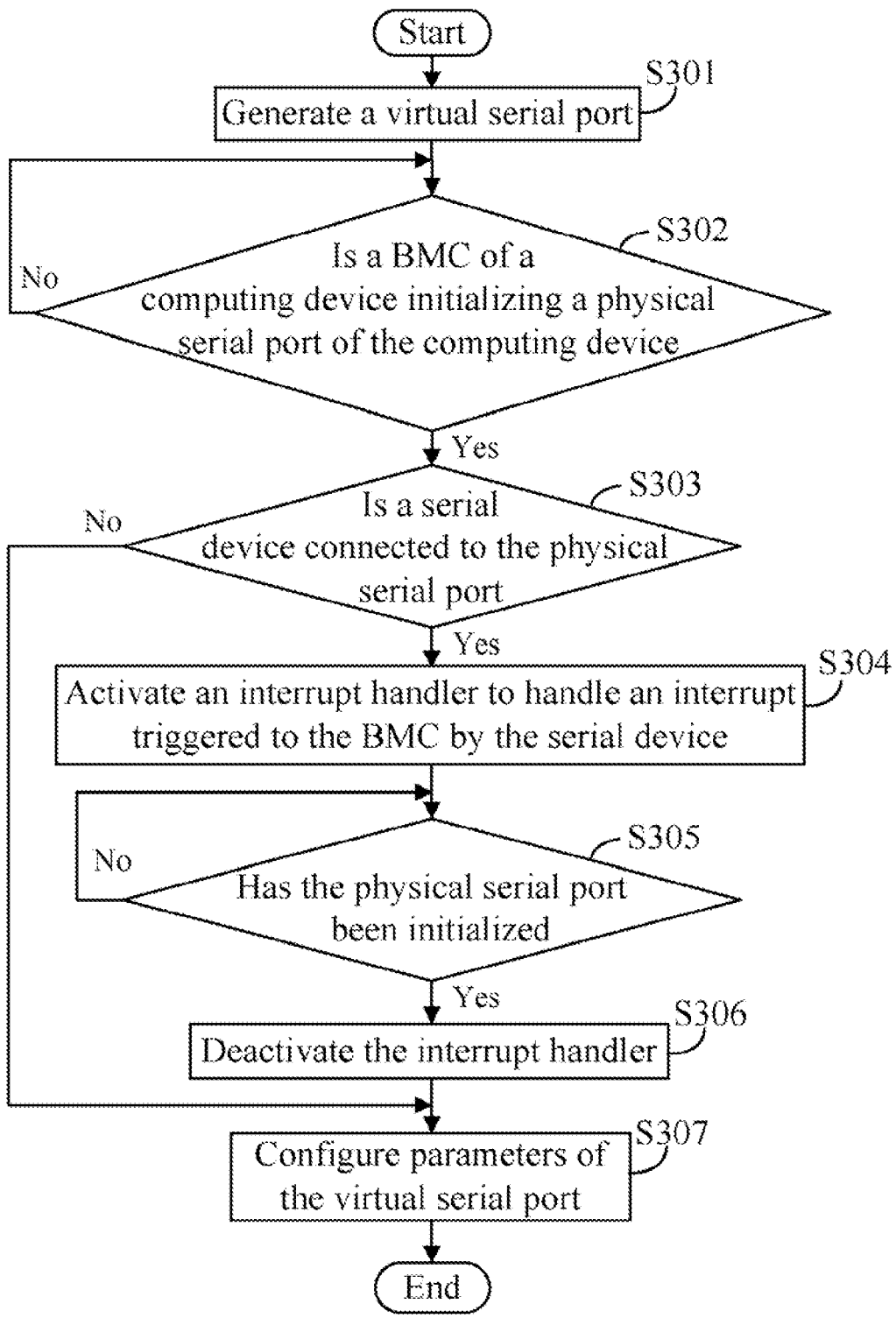
FIG. 3 is a flowchart of one embodiment of a serial communication method of a computing device such as, for example, that of FIG. 1.

FIG. 3 is a flowchart of one embodiment of a serial communication method of a computing device such as, for example, that of FIG. 1. Depending on the embodiments, additional blocks may be added, others removed, and the ordering of the blocks may be changed.

In block S301, the generation module 200 generates a virtual serial port for the OS 12 by emulating serial port functionality, such as baud rate, data bits, parity bits, and stop bits of the physical serial port 16.

In block S302, the first detection module 210 detects whether the BMC 11 is initializing the physical serial port 16. In one embodiment, the first detection module 210 detects whether the BMC 11 is initializing the physical serial port 16 according to a general input/output (GPIO) signal received from the BMC 11. The BMC 11 may output the GPIO signal with a high level (i.e., high voltage or logic 1) to the first detection module 210 when the BMC 11 is initializing the physical serial port 16. If the BMC 11 is not initializing the physical serial port 16, the BMC 11 may output the GPIO signal with a low level (i.e., low voltage or logic 0) to the first detection module 210.

If the BMC 11 is initializing the physical serial port 16, in block S302, the first detection module 210 detects whether a serial device is connected to the physical serial port 16. If the BMC 11 is not initializing the physical serial port 16, block S302 is repeated.

If the serial device is connected to the physical serial port 16, in block S304, the activation module 220 activates an interrupt handler to handle an interrupt triggered to the BMC 11 by the serial device. If the serial device is not connected to the physical serial port 16, the process goes to block S307.

In block S305, the second detection module 230 detects whether the physical serial port 16 has been initialized by the BMC 11.

If the physical serial port 16 has been initialized by the BMC 11, in block S306, the deactivation module 240 deactivates the interrupt handler, and allows subsequent interrupts triggered to the OS 12 to be processed. If the physical serial port 16 has not been initialized by the BMC 11, block S305 is repeated.

In block S307, the configuration module 250 configures parameters of the virtual serial port generated by the generation module 200, so that the OS 12 can communicate serially with the serial device via the virtual serial port.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, comprising:
a baseboard management controller (BMC) comprising at least one physical serial port;
an operating system (OS);
a storage system;
at least one processor;
a serial communication unit comprising computerized codes in the form of one or more programs, which are stored in the storage system and executed by the at least one processor, the one or more programs comprising:
a generation module operable to generate a virtual serial port for the OS by emulating serial port functionality of the physical serial port;
a first detection module operable to detect whether the BMC is initializing the physical serial port, and detect whether a serial device is connected to the physical serial port when the BMC is initializing the physical serial port;
an activation module operable to activate an interrupt handler to handle an interrupt triggered to the BMC by the serial device in a timely manner;
a second detection module operable to detect whether the physical serial port has been initialized by the BMC; and
a deactivation module operable to deactivate the interrupt handler when the physical serial port has been initialized by the BMC.

2. The computing device of claim 1, wherein the one or more programs further comprises a configuration module operable to configure parameters of the virtual serial port.

3. The computing device of claim 1, wherein the interrupt handler sets a certain register of the computing device.

4. The computing device of claim 1, wherein the second detection module detects the physical serial port at a predetermined frequency.

5. The computing device of claim 1, wherein the parameters of the virtual serial port comprise a serial port number, a baud rate, a data bit length, an optional parity bit, and a stop bit length.

6. The computing device of claim 1, wherein the serial device is a mouse, a keyboard, or a printer.

7. A serial communication method of a computing device, the computing device comprising a baseboard management controller (BMC) and an operating system (OS), the BMC comprising at least one physical serial port, the method comprising:
generating a virtual serial port for the OS by emulating serial port functionality of the physical serial port;
detecting whether the BMC is initializing the physical serial port, and detecting whether a serial device is connected to the physical serial port when the BMC is initializing the physical serial port;
activating an interrupt handler to handle an interrupt triggered to the BMC by the serial device in a timely manner;
detecting whether the physical serial port has been initialized by the BMC; and
deactivating the interrupt handler when the physical serial port has been initialized by the BMC.

8. The method of claim 7, further comprising:
configuring parameters of the virtual serial port.

9. The method of claim 7, wherein the interrupt handler sets a certain register of the computing device.

10. The method of claim 7, wherein the physical serial port is detected at a predetermined frequency.

11. The method of claim 7, wherein the parameters of the virtual serial port comprise a serial port number, a baud rate, a data bit length, an optional parity bit, and a stop bit length.

12. The method of claim 7, wherein the serial device is a mouse, a keyboard, or a printer.

13. A non-transitory storage medium having stored thereon instructions that, when executed by a processor of a computing device, causes the computing device to execute a serial communication method, the computing device comprising a baseboard management controller (BMC) and an operating system (OS), the BMC comprising at least one physical serial port, the method comprising:
generating a virtual serial port for the OS by emulating serial port functionality of the physical serial port;
detecting whether the BMC is initializing the physical serial port, and detecting whether a serial device is connected to the physical serial port when the BMC is initializing the physical serial port;
activating an interrupt handler to handle an interrupt triggered to the BMC by the serial device;
detecting whether the BMC has finished initializing the physical serial port; and
deactivating the interrupt handler when the physical serial port has been initialized by the BMC.

14. The medium of claim 13, wherein the method further comprises:
configuring parameters of the virtual serial port.

15. The medium of claim 13, wherein the interrupt handler sets a certain register of the computing device.

16. The medium of claim 13, wherein the physical serial port is detected at a predetermined frequency.

17. The medium of claim 13, wherein the parameters of the virtual serial port comprise a serial port number, a baud rate, a data bit length, an optional parity bit, and a stop bit length.

18. The medium of claim 13, wherein the serial device is a mouse, a keyboard, or a printer.

* * * * *